United States Patent

Ondeck et al.

[11] Patent Number: 5,948,557
[45] Date of Patent: Sep. 7, 1999

[54] VERY THIN MICROPOROUS MATERIAL

[75] Inventors: Raymond R. Ondeck, McMurray; Richard W. Pekala, Allison Park, both of Pa.; Richard A. Schwarz, Akron, Ohio; Robert C. Wang, Wexford, Pa.

[73] Assignee: PPG Industries, Inc., Pittsburgh, Pa.

[21] Appl. No.: 08/942,497

[22] Filed: Oct. 2, 1997

Related U.S. Application Data

[60] Provisional application No. 60/028,894, Oct. 18, 1996.

[51] Int. Cl.$^6$ .............................. H01M 6/18; H01G 9/00; C08J 9/28

[52] U.S. Cl. .............................. 429/33; 429/309; 521/62; 521/64; 361/524; 361/502; 428/315.7

[58] Field of Search ...................... 429/33, 192; 521/62, 521/64, 143; 428/315.7; 361/524, 502, 321.5

[56] References Cited

U.S. PATENT DOCUMENTS

| | | | |
|---|---|---|---|
| 4,237,083 | 12/1980 | Young et al. | |
| 4,434,250 | 2/1984 | Kessler | 521/64 |
| 4,472,328 | 9/1984 | Sugimoto et al. | 264/41 |
| 4,585,604 | 4/1986 | Okuyama et al. | 264/41 |
| 4,588,633 | 5/1986 | Kono et al. | 428/220 |
| 4,713,273 | 12/1987 | Freedman | 428/40 |
| 4,828,772 | 5/1989 | Lopatin et al. | 264/45.9 |
| 4,833,172 | 5/1989 | Schwarz et al. | 521/62 |
| 4,877,679 | 10/1989 | Leatherman et al. | 428/224 |
| 4,888,075 | 12/1989 | Freedman | 156/243 |
| 4,892,779 | 1/1990 | Leatherman et al. | 428/220 |
| 4,937,115 | 6/1990 | Leatherman | 428/36.4 |
| 4,957,787 | 9/1990 | Reinhardt et al. | 428/24 |
| 4,957,943 | 9/1990 | McAllister et al. | 521/64 |
| 4,959,208 | 9/1990 | Chakrabarti et al. | 424/78 |
| 5,032,450 | 7/1991 | Rechlicz et al. | 428/196 |
| 5,130,342 | 7/1992 | McAllister et al. | 521/61 |
| 5,196,262 | 3/1993 | Schwarz et al. | 428/315.5 |
| 5,326,391 | 7/1994 | Anderson et al. | 106/409 |
| 5,534,365 | 7/1996 | Gee et al. | |
| 5,683,634 | 11/1997 | Fujii et al. | 164/41 |

FOREIGN PATENT DOCUMENTS

| | | |
|---|---|---|
| 2-204021 | 8/1990 | Japan. |
| 2-289631 | 11/1990 | Japan. |
| 7-216120 | 8/1995 | Japan. |
| 1044028 | 7/1963 | United Kingdom. |
| 1044503 | 3/1964 | United Kingdom. |
| 1044502 | 3/1965 | United Kingdom. |
| WO 95/13316 | 5/1995 | WIPO. |

OTHER PUBLICATIONS

Abstract for JP 02 [1990] 204021, Aug. 1990.
Abstract for JP 02 [1990] 289631, Nov. 1990.
Abstract for JP 02 [1990] 216120, Aug. 1995.

*Primary Examiner*—John S. Maples
*Attorney, Agent, or Firm*—George D. Morris

[57] ABSTRACT

Very thin microporous material comprises a matrix of substantially linear polyolefin, finely divided substantially water-insoluble filler particles distributed throughout the matrix, and a network of interconnecting pores communicating substantially throughout said microporous material. The very thin microporous material can be produced by the blown film process. The material is used as a separator in a battery.

29 Claims, No Drawings

VERY THIN MICROPOROUS MATERIAL

This application claims the benefit of U.S. Provisional Application No. 60/028,894, filed Oct. 18, 1996.

U.S. Pat. No. 4,833,172 describes microporous material in the form of a thin sheet, film, or tube having a thickness across the microporous material in the range of from about 0.03 to about 0.25 millimeter (viz., from about 30 to about 250 micrometers). Briefly, the procedure for producing such microporous material comprises extruding a mixture comprising polymer, particulate filler, and processing plasticizer to form a sheet, calendering the sheet, extracting the processing plasticizer from the calendered sheet, drying the extracted sheet to form precursor microporous material, and stretching the precursor microporous material in one or more directions using differentially rotating rollers and/or tentering machines to form as a product thinner microporous material having increased porosity as compared to the precursor microporous material and also having regions of stretch-induced molecular orientation. Such stretched microporous material has many useful properties, but unfortunately the minimum thickness attainable by such stretching procedures is about 30 micrometers which limits its utility in many areas. Even the lower limit of about 30 micrometers can be attained only rarely and with great difficulty using the above procedures.

Very thin microporous material has now been discovered which, due to its extreme thinness and its composition, is useful in a variety of products in which thicker materials perform either not as well or not at all. Examples of such products include labels. Especially contemplated labels are those which will show evidence of tampering. When desired, an exterior surface of the very thin microporous material constituting the label may be written or printed upon. Other examples include diffusion membranes. Yet other examples include energy storage devices having at least two electrodes separated by dielectric material which is microporous material of the invention. Suitable energy storage devices include batteries, capacitors, and fuel cells. The microporous material is especially useful as dielectric material in lithium ion batteries.

Accordingly, one embodiment of the invention is microporous material in the form of a sheet, film, tube having an internal diameter of at least 8 centimeters, or layer thereof, having a thickness in the range of from 5 to 26 micrometers which on a coating-free, printing ink-free, impregnant-free basis and pre-bonding basis comprises: (a) a matrix which comprises: (1) from 0 to 100 percent by weight high molecular weight substantially linear polyolefin which is high molecular weight substantially linear polyethylene having an ASTM D 1238-86 Condition E melt index of less than 50 grams/10 minutes, an ASTM D 1238-86 Condition F melt index of at least 0.1 gram/10 minutes, and a density in the range of from 0.910 to 0.965 gram/cubic centimeter; high molecular weight substantially linear polypropylene having an ASTM D 1238-86 Condition L melt index in the range of from 0.2 to 50 grams/10 minutes and a density greater than 0.89 gram/cubic centimeter; or a mixture thereof; and (2) from 0 to 100 percent by weight ultrahigh molecular weight substantially linear polyolefin which is ultrahigh molecular weight substantially linear polyethylene having an intrinsic viscosity of at least 18 deciliters/gram; ultrahigh molecular weight substantially linear polypropylene having an intrinsic viscosity of at least 6 deciliters/gram; or a mixture thereof; wherein the high molecular weight substantially linear polyolefin and the ultrahigh molecular weight substantially linear polyolefin collectively constitute from 90 to 100 percent by weight of the matrix; (b) finely divided substantially water-insoluble filler particles distributed throughout said matrix and constituting from 20 to 85 percent by weight of said microporous material, and (c) a network of interconnecting pores communicating substantially throughout said microporous material, the pores constituting at least 25 percent by volume of said microporous material.

Another embodiment of the invention is microporous material in the form of a sheet, film, tube having an internal diameter of at least 8 centimeters, or layer thereof, having a thickness in the range of from 5 to 26 micrometers which on a coating-free, printing ink-free, impregnant-free basis and pre-bonding basis comprises: (a) a matrix consisting essentially of substantially linear polyolefin which comprises: (1) from 70 to 100 percent by weight high molecular weight substantially linear polyolefin which is high molecular weight substantially linear polyethylene having an ASTM D 1238-86 Condition E melt index of less than 50 grams/10 minutes, an ASTM D 1238-86 Condition F melt index of at least 0.1 gram/10 minutes, and a density in the range of from 0.910 to 0.965 gram/cubic centimeter; high molecular weight substantially linear polypropylene having an ASTM D 1238-86 Condition L melt index in the range of from 0.2 to 50 grams/10 minutes and a density greater than 0.89 gram/cubic centimeter; or a mixture thereof; and (2) from 0 to 30 percent by weight ultrahigh molecular weight substantially linear polyolefin which is ultrahigh molecular weight substantially linear polyethylene having an intrinsic viscosity of at least 18 deciliters/gram; ultrahigh molecular weight substantially linear polypropylene having an intrinsic viscosity of at least 6 deciliters/gram; or a mixture thereof; (b) finely divided substantially water-insoluble filler particles distributed throughout said matrix and constituting from 20 to 60 percent by weight of said microporous material, and (c) a network of interconnecting pores communicating substantially throughout said microporous material, the pores constituting at least 25 percent by volume of said microporous material.

Other than in the operating examples or where otherwise indicated, all numbers in the present specification and claims which express reaction conditions, ranges, or quantities of ingredients, are to be understood as modified by the term "about".

Many different types of high molecular weight substantially linear polyethylene having an ASTM D 1238-86 Condition E melt index of less than 50 grams/10 minutes and an ASTM D 1238-86 Condition F melt index of at least 0.1 gram/10 minutes are known. One method of classification is by density, expressed in grams/cubic centimeter and rounded to the nearest thousandth, in accordance with ASTM D 1248-84 (Reapproved 1989):

TABLE 1

| Type | Abbreviation | Density, g/cm³ |
| --- | --- | --- |
| Low Density Polyethylene | LDPE | 0.910–0.925 |
| Medium Density Polyethylene | MDPE | 0.926–0.940 |
| High Density Polyethylene | HDPE | 0.941–0.965 |

Any or all of these polyethylenes may be used in the present invention. HDPE, however, is preferred because it ordinarily tends to be more linear than MDPE or LDPE.

The ASTM D 1238-86 Condition E (that is, 190° C. and 2.16 kilogram load) melt index of the polyethylene is less than 50 grams/10 minutes. Often the Condition E melt index is less than 25 grams/10 minutes. Preferably the Condition E melt index is less than 15 grams/10 minutes.

The ASTM D 1238-86 Condition F (that is, 190° C. and 21.6 kilogram load) melt index of the polyethylene is at least 0.1 gram/10 minutes. In many cases the Condition F melt index is at least 0.5 gram/10 minutes. Preferably the Condition F melt index is at least 1.0 gram/10 minutes.

Many different types of high molecular weight substantially linear polypropylene having an ASTM D 1238-86 Condition L (that is, 230° C. and 2.16 kilogram load) melt index in the range of from 0.2 to 50 grams/10 minutes and a density greater than 0.89 gram/cubic centimeter, are known. The polypropylene may be a homopolymer or it may be a copolymer of propylene with one or more other monomers, usually but not necessarily in minor amount. The high molecular weight substantially linear polypropylene is most frequently substantially linear high molecular weight isotactic polypropylene. Often the degree of isotacticity of such polymer is at least 95 percent, while preferably it is at least 98 percent. The ASTM D 1238-86 Condition L melt index in the range of from 0.2 to 50 grams/10 minutes. Often it is in the range of from 0.3 to 20 grams/10 minutes. From 0.3 to 8 grams/10 minutes is preferred.

High molecular weight substantially linear polyolefin (in contradistinction to the substantially linear ultrahigh molecular weight polyolefin to be discussed in more detail below) constitutes from 0 to 100 percent by weight of the matrix. Often the high molecular weight substantially linear polyolefin constitutes from 40 to 100 percent by weight of the matrix. Frequently the high molecular weight substantially linear polyolefin constitutes from 50 to 100 percent by weight of the matrix. Commonly the high molecular weight substantially linear polyolefin constitutes from 70 to 100 percent by weight of the matrix. In many cases the high molecular weight substantially linear polyolefin constitutes from 75 to 100 percent by weight of the matrix. In some instances the high molecular weight substantially linear polyolefin constitutes from 80 to 100 percent by weight of the matrix. Often the high molecular weight substantially linear polyolefin constitutes from 0 to 99 percent by weight of the matrix. In many instances the high molecular weight substantially linear polyolefin constitutes from 30 to 60 percent by weight of the matrix.

The nominal molecular weight of the ultrahigh molecular weight substantially linear polyolefin is higher than the high molecular weight substantially linear polyolefin discussed above. Inasmuch as ultrahigh molecular weight (UHMW) polyolefin is not a thermoset polymer having an infinite molecular weight, it is technically classified as a thermoplastic. However, because the molecules are substantially very long chains, UHMW polyolefin, and especially UHMW polyethylene, softens when heated but does not flow as a molten liquid in a normal thermoplastic manner. The very long chains and the peculiar properties they provide to UHMW polyolefin are among the beneficial characteristics of this polymer.

As indicated earlier, the intrinsic viscosity of the UHMW polyethylene is at least 10 deciliters/gram. Usually the intrinsic viscosity is at least 14 deciliters/gram. Often the intrinsic viscosity is at least 18 deciliters/gram. In many cases the intrinsic viscosity is at least 19 deciliters/gram. Although there is no particular restriction on the upper limit of the intrinsic viscosity, the intrinsic viscosity is frequently in the range of from 10 to 39 deciliters/gram. The intrinsic viscosity is often in the range of from 14 to 39 deciliters/gram. In most cases the intrinsic viscosity is in the range of from 18 to 39 deciliters/gram. An intrinsic viscosity in the range of from 18 to 32 deciliters/gram is preferred.

Also as indicated earlier the intrinsic viscosity of the UHMW polypropylene is at least 6 deciliters/gram. In many cases the intrinsic viscosity is at least 7 deciliters/gram. Although there is no particular restriction on the upper limit of the intrinsic viscosity, the intrinsic viscosity is often in the range of from 6 to 18 deciliters/gram. An intrinsic viscosity in the range of from 7 to 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer according to the equation:

$$M = 5.37 \times 10^4 [\eta]^{1.37}$$

where M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the equation:

$$M = 8.88 \times 10^4 [\eta]^{1.25}$$

where M is the nominal molecular weight and $[\eta]$ is the intrinsic viscosity of the UHMW polypropylene expressed in deciliters/gram.

The ultrahigh molecular weight substantially linear polypropylene is most frequently ultrahigh molecular weight substantially linear isotactic polypropylene. Often the degree of isotacticity of such polymer is at least 95 percent, while preferably it is at least 98 percent.

Ultrahigh molecular weight substantially linear polyolefin is an optional material which constitutes from 0 to 100 percent by weight of the matrix. Often the ultrahigh molecular weight substantially linear polyolefin constitutes from 0 to 30 percent by weight of the matrix. In many cases the ultrahigh molecular weight substantially linear polyolefin constitutes from 0 to 25 percent by weight of the matrix. In some instances the ultrahigh molecular weight substantially linear polyolefin constitutes from 0 to 20 percent by weight of the matrix. Frequently ultrahigh molecular weight substantially linear polyolefin constitutes from 0.1 to 30 percent by weight of the matrix. Often ultrahigh molecular weight substantially linear polyolefin constitutes from 0.5 to 25 percent by weight of the matrix. In many cases ultrahigh molecular weight substantially linear polyolefin constitutes from 1 to 100 percent by weight of the matrix. In some instances ultrahigh molecular weight substantially linear polyolefin constitutes from 1 to 25 percent by weight of the matrix. On many occasions ultrahigh molecular weight substantially linear polyolefin constitutes from 50 to 100 percent by weight of the matrix. On some occasions ultrahigh molecular weight substantially linear polyolefin constitutes from 60 to 100 percent by weight of the matrix. Often ultrahigh molecular weight substantially linear polyolefin constitutes from 40 to 70 percent by weight of the matrix.

The high molecular weight substantially linear polyolefin and the ultrahigh molecular weight substantially linear polyolefin collectively constitute from 90 to 100 percent by weight of the matrix. Often they collectively constitute from 95 to 100 percent by weight of the matrix. Preferably they collectively constitute from 98 to 100 percent by weight of the matrix. It is especially preferred that they collectively constitute 100 percent by weight of the matrix.

Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. In most instances the other thermoplastic organic polymer constitutes less than 10 percent by weight of the matrix. Often the other thermoplastic organic polymer constitutes less than 5 percent by weight of the matrix. Less than 2 percent by weight is preferred. It is especially preferred that the other thermoplastic organic polymer be absent.

The finely divided substantially water-insoluble particles may be siliceous or non-siliceous particles.

Examples of suitable siliceous particles include particles of silica, mica, montmorillonite, kaolinite, asbestos, talc, diatomaceous earth, vermiculite, natural and synthetic zeolites, cement, calcium silicate, magnesium silicate, aluminum silicate, sodium aluminum silicate, aluminum polysilicate, alumina silica gels, and glass particles. Silica and the clays are the preferred siliceous particles. Of the silicas, precipitated silica, silica gel, or fumed silica is most often used.

Examples of non-siliceous filler particles include particles of carbon black, titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

The preferred finely divided substantially water-insoluble filler particles are siliceous particles.

As present in the microporous material, the finely divided substantially water-insoluble filler particles may be in the form of ultimate particles, aggregates of ultimate particles, or a combination of both. The gross particle sizes are usually less than 75 percent of the thickness of the microporous material. Often the gross particle sizes are usually less than 50 percent of the thickness of the microporous material. Preferably the gross particle sizes are usually less than 30 percent of the thickness of the microporous material.

The gross particle sizes of the finely divided substantially water-insoluble filler particles used in preparing the microporous material may vary widely. In those instances where the sizes of filler agglomerates may be easily reduced during processing of the ingredients to prepare the microporous material, particles having much larger gross particle sizes than those ultimately present in the microporous material may be employed. Sizes up to and even surpassing 80 micrometers, 150 micrometers, or even 300 micrometers may be used in such circumstances. In those instances where the particles are not very friable, the sizes should be on the order of those ultimately present in the microporous material. Usually at least 90 percent by weight of the filler particles used in preparing the microporous material have gross particle sizes in the range of from 0.1 to 300 micrometers. In most cases, at least 90 percent by weight of the filler particles used in preparing the microporous material have gross particle sizes in the range of from 0.1 to 40 micrometers. Preferably at least 90 percent by weight of the filler particles used in preparing the microporous material have gross particle sizes in the range of from 0.1 to 30 micrometers.

The instruments and protocols used to ascertain gross particle sizes depend upon the ranges of particle sizes for which they were designed to measure. An example is the Model TAII Coulter counter (Coulter Electronics, Inc.) used according to ASTM C 690-80 but modified by stirring the filler for 10 minutes in Isoton II electrolyte (Curtin Matheson Scientific, Inc.) using a four-blade, 4.445 centimeter diameter propeller stirrer. Another example is the Micromeretics Sedigraph 5000-D (Micromeretics Instrument Corp.) used in accordance with the accompanying operating manual. Yet other examples include the electron microscope and the optical microscope used in accordance with well known procedures.

The particularly preferred finely divided substantially water insoluble siliceous filler particles are precipitated silica particles. Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is substantially no difference in density between the gel phase and the surrounding liquid phase while the viscosity is low, the gel phase does not settle out, that is to say, it does not precipitate. Silica gel, then, may be described as a nonprecipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate or potassium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Amorphous precipitated silica particles usually constitute at least 50 percent by weight of the finely divided substantially water-insoluble filler particles. In many cases amorphous precipitated silica particles constitute at least 65 percent by weight of the finely divided substantially water-insoluble filler particles. Often amorphous precipitated silica particles constitute at least 75 percent by weight of the finely divided substantially water-insoluble filler particles. Frequently amorphous precipitated silica particles constitute at least 85 percent by weight of the finely divided substantially water-insoluble filler particles. Usually all of the finely divided substantially water-insoluble filler particles are amorphous precipitated silica particles.

The finely divided substantially water-insoluble filler particles constitute from 20 to 85 percent by weight of the microporous material. Frequently such filler particles constitute from 20 to 80 percent by weight of the microporous material. In many instances they constitute from 20 percent to 70 percent by weight of the microporous material. The finely divided substantially water-insoluble filler particles often constitute from 20 to 60 percent by weight of the microporous material. Frequently such filler particles constitute from 20 to 55 percent by weight of the microporous material. In many cases they constitute from 20 percent to 45 percent by weight of the microporous material.

Minor amounts, usually less than 10 percent by weight, of other materials used in processing such as lubricant, processing plasticizer, organic extraction liquid, water, and the like, may optionally also be present in the microporous material. Yet other materials introduced for particular purposes may optionally be present in the microporous material in small amounts, usually less than 15 percent by weight. Examples of such materials include antioxidants, ultraviolet light absorbers, reinforcing fibers such as chopped glass fiber strand, dyes, pigments, and the like. Materials exemplified by the foregoing types may collectively be regarded as additives. The balance of the microporous material, exclusive of filler and any coating, printing ink, or impregnant applied for one or more special purposes is substantially the thermoplastic organic polymer.

On a coating-free, printing ink free, impregnant-free, and pre-bonding basis, pores constitute from 25 to 90 percent by volume of the microporous material. In many cases the pores constitute from 25 to 80 percent by volume of the microporous material. As used herein and in the claims, the porosity (also known as void volume) of the microporous material, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined by dividing the sum of the weights of each component of the sample by the sum of the volumes of each component of the sample. The volume of each component is determined by dividing the weight of that component in the sample by the solid density of that component.

Inasmuch as some coating processes, printing processes, impregnation processes and bonding processes result in filling at least some of the pores of the microporous material and since some of these processes irreversibly compress the microporous material, the parameters in respect of porosity, volume average diameter of the pores, and maximum pore diameter are determined for the microporous material prior to application of one or more of these processes.

The very thin microporous material of the invention may be produced by the blown film process. The blown film process itself and the apparatus used in the blown film process, are both well known for producing polyolefin films. According to the known process, polymer composition is introduced to an extruder which heats, mixes, and extrudes the composition through an annular opening of a blown film die of conventional construction to form a polymer tube. When desired, one or more other extruders may feed the same or different polymer to the same blown film die so as to provide a multilayer polymer tube issuing from the final annular opening of the die. Blown film dies which can form 2, 3, 4, 5, or more layers are known and are commercially available. The polymer tube, whether monolayer or multilayer, exits the die in a vertical direction. Simultaneously, air or other gas is blown on the inside of the polymer tube to expand the tube into an tubular membrane bubble having a larger diameter than that of the tube exiting the extrusion die. This is referred to as stretching in the transverse direction, TD. The tubular membrane bubble is directed by guides to nip rolls which collapse the bubble thereby producing a collapsed membrane tube. In most instances the nip rolls are rotated at such a speed that the tubular membrane bubble is also stretched longitudinally along its axis. This is referred to as stretching in the machine direction, MD. When necessary or desirable, cooling air is blown at one or more locations on the outside and/or inside the extruded tube and/or the membrane bubble. The collapsed tube is usually either wound on mandrels or slit longitudinally to form flat films which are wound on mandrels.

In the case of the present invention, the well known blown film process is adapted to produce the very thin microporous material by introducing the appropriate composition(s) comprising polymer, filler, and processing plasticizer to one or more extruders which discharge to the blown film die, and by adjusting the stretching ratios so as to obtain a very thin microporous material product.

When multi-layer films are produced, multiple extruders are usually used. The thickness of each layer can be controlled by the relative feed rate for that individual layer. As is well known to those skilled in the art of producing multi-layer extruded sheets and films, the relative feed rate for a layer is controlled by many factors such as, but not limited to, extruder output, feed block or manifold design, die design, polymer viscosity and temperature, and other operating parameters. One extruder can feed more than one layer for the final multi-layer product; therefore, the control of relative feed rates for individual layers fed from the same extruder will require splitting the extruder output and controlling the relative flow for each layer.

In the present invention, the multiple layers can have the same or different compositions. At least one layer of the multi-layer product is microporous material of the present invention. The other layer(s) may be microporous, macroporous, or nonporous as desired, provided that the structure is such that each layer of microporous material of the present invention is connected by porous channels to the exterior of the multilayer product so that processing plasticizer can be extracted during manufacture. When the multi-layer product is a two-layer product, at least one of the layers is microporous material of the present invention; the other layer may be microporous, macroporous, or nonporous as is desired. When the multi-layer product has three or more layers, it is preferred that at least one of the surface layers be microporous material of the present invention. It is especially preferred that both surface layers be microporous material of the present invention. When two or more layers are each microporous material of the present invention, the compositions can be the same or different.

When there are multiple microporous material layers of the same or similar composition, there is a very low probability that defects will occur in all layers at exactly the same location in all layers. Therefore, the probability of a pinhole defect penetrating through the entire thickness of the film is reduced.

The multi-layer product may have any thickness customarily characteristic of products of these types; however, at least one layer is microporous material of the present invention which has a thickness in the range of from 5 to 26 micrometers.

Layers which are not microporous material of the present invention (viz., optional layers) are comprised of polymers which can be processed by the method described herein. Preferred polymers are the high molecular weight linear polyolefins described above as components of the microporous material of the present invention. These polymers may be used as received or they may be blended with other polymers and/or fillers. Typical fillers are the siliceous and non-siliceous materials described above for the microporous materials of the present invention, although others can be used. Fillers with surface treatments to modify the interaction of the filler surface with the polymer are also contemplated. Often the filler is talc, calcium carbonate, or mica. The filler may be present at 0 to 50 weight percent of the optional layer. Often the filler is present at 0 to 35 weight percent of the optional layer. The composition used to form an optional layer may also contain a blowing agent to create a macrovoided or microvoided layer. The generation of porous polymer films by stretching filled polymers is known in the art. Generally these films lack the high degree of interconnectivity of voids found in the microporous materials of the present invention.

Preferably filler particles, thermoplastic organic polymer powder, processing plasticizer, and minor amounts of lubricant and antioxidant are mixed until a substantially uniform mixture is obtained. The weight ratio of filler to polymer employed in forming the mixture is substantially the same as that of the microporous material to be produced. The mixture, together with additional processing plasticizer, is introduced to the heated barrel of a screw extruder. Attached to the extruder is a blown film die. A continuous tube formed by the die is often stretched in the MD and is stretched by blowing in the TD to form a tubular membrane bubble. The bubble is then collapsed by rollers as describe above to form a collapsed membrane tube. At this point the collapsed tube can be forwarded to mandrels, or the processing plasticizer can be extracted from the tube and then forwarded to mandrels. More preferably, however, the tube can be slit longitudinally to form flat films which are wound on mandrels or the processing plasticizer can be extracted from the films and then the extracted films wound on mandrels. Winding films or tube on mandrels is usual, but it is by no means necessary. The tube or films can alternatively be folded and packaged or they can be forwarded directly for further processing.

The continuous tube or film sheet passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous tube or film, which is very thin microporous material, is usually passed to a take-up roll.

The processing plasticizer has little solvating effect on the thermoplastic organic polymer at 60° C., only a moderate solvating effect at elevated temperatures on the order of 100° C., and a significant solvating effect at elevated temperatures on the order of 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are oils which have a pour point of less than 22° C. according to ASTM D 97-66 (Reapproved 1978). Particularly preferred are oils having a pour point of less than 10° C. Examples of suitable oils include Shellflex® 412 oil, Shellflex® 371 oil, and Shellflex® 3681 oil (Shell Oil Co.) which are solvent refined and hydrotreated oils derived from naphthenic crude. Further examples of suitable oils include ARCOprime® 400 oil (Atlantic Richfield Co.), Tufflo® 6056 oil (Atlantic Richfield Co.), and Kaydol® oil (Witco Corp.) which are white mineral oils. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

The above described process for producing microporous material is facilitated when the substantially water-insoluble filler particles carry much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler particles is in the range of from 20 to 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from 25 to 350 square meters per gram. Preferably, but not necessarily, the surface area of any non-siliceous filler particles used is also in at least one of these ranges.

Inasmuch as it is desirable to substantially retain the filler in the microporous material, it is preferred that the substantially water-insoluble filler particles be substantially insoluble in the processing plasticizer and substantially insoluble in the organic extraction liquid when microporous material is produced by the above process.

The residual processing plasticizer content is usually less than 10 percent by weight of the microporous material and this may be reduced even further by additional extractions using the same or a different organic extraction liquid. In many instances the residual processing plasticizer content is less than 5 percent by weight of the microporous material. Often the residual processing plasticizer content is less than 3 percent by weight of the microporous material and this may be reduced even further by additional extractions.

In most instances some stretching occurs parallel to the axis of the tubular membrane bubble (viz., in the machine direction, which is abbreviated MD). MD stretching is caused by taking bubble up at the collapsing rollers at a linear rate greater than the extrusion rate from the annular die. The amount of MD stretching is difficult to quantify and so it is usually set empirically.

Stretching in directions perpendicular to the axis of the tubular membrane bubble (viz., in the transverse directions, which is abbreviated TD), occurs during bubble formation. Such TD stretching is usually described in terms of blow up ratio. As used herein and in the claims, the blow up ratio is defined as the ratio of the diameter of the tubular membrane bubble to the diameter of the annular die. In practicing the present invention the blow up ratio is usually at least 2. Frequently the blow up ratio is at least 2.5. In most instances the blow up ratio is at least 3. Often the blow up ratio is in the range of from 2.5 to 6, although blow up ratios somewhat greater than 6 can sometimes be used. In many instances the blow up ratio is in the range of from 2 to 5. Preferably the blow up ratio is in the range of from 3 to 5.

The temperatures at which stretching is accomplished may vary widely. Stretching may be accomplished at ambient room temperature, but usually temperatures above 23° C. are employed. The temperatures employed will depend upon the composition(s) used in forming the microporous membrane material.

The microporous material of the invention may optionally be coated, impregnated, and/or printed with a wide variety of coating compositions, impregnating compositions, and/or printing inks using a wide variety of coating, impregnating, and/or printing processes. The coating compositions, coating processes, impregnating compositions, impregnation processes, printing inks, and printing processes are themselves conventional. The printing, impregnation, and coating of microporous material are more fully described in U.S. Pat. Nos. 4,861,644; 5,032,450; and 5,047,283.

The invention is further described in conjunction with the following examples which are to be considered illustrative rather than limiting.

EXAMPLES 1–2

The ingredients given in Table 2 were combined in a 20 liter Henschel horizontal mixer by adding all dry ingredients to the mixer and blending with low speed agitation for 0.25 minutes. Hot (65 ° C.) oil was then sprayed onto the blended, dry ingredients over 1 minute with high speed agitation. A 0.25 minute post mix (after completion of oil addition) was used.

TABLE 2

| Component | Example 1 | Example 2 |
|---|---|---|
| UHMWPE[1], g | 0 | 135.0 |
| HDPE[2], g | 716.0 | 581.0 |
| Silica[3], g | 500.0 | 500.0 |
| Antioxidant[4], g | 2.7 | 2.7 |
| Lubricant[5], g | 2.7 | 2.7 |
| Oil[6], g | 785.0 | 785.0 |

TABLE 2-continued

| Component | Example 1 | Example 2 |
|---|---|---|

[1]Ultrahigh Molecular Weight Polyethylene; GUR ® 4132, Hoechst-Celanese Corp.
[2]High Density Polyethylene; Hoechst Celanese 7255 Powder, Hoechst-Celanese Corp.
[3]Hi-Sil ® SBG precipitated silica, PPG Industries, Inc.
[4]Irganox ® B-215 antioxidant, Ciba-Geigy Corp.
[5]Petrac ® CZ-81 lubricant, Synpro Corp.
[6]Shellflex 3681, Shell Oil Co.

Film samples were prepared by extrusion of the mix and additional oil in a Leistritz 27 millimeters counter-rotating twin screw extruder fitted with a Brabender 25 millimeters diameter blown film ring die with a 0.51 millimeters die gap. The feed ratio of the mix and additional oil was adjusted to give 58 weight percent oil in the extrudate. The throughput rate was approximately 2.73 kg/hr. The tubular extrudate was cooled with an air ring and drawn in the MD by motorized nip rolls located approximately 1.22 meters above the die face. Bubble formation was accomplished by inflating the tubular extrudate with 20 to 56 kPa internal air pressure. The inflated tube moved upward and was collapsed by a wooden slat collapsing frame and the aforementioned motorized nip rolls. The collapsed tube was wound up on a driven cardboard tube at approximately 7.6 meters per minute. The layflat width was approximately 18 cm.

Samples of the blown film were extracted with trichloroethylene at room temperature. In order to keep the samples as flat and wrinkle free as possible, small lengths, 4.6 meters, were carefully wound onto a 57 millimeters outside diameter high density polyethylene pipe. The starting end of the film was clamped in an axial slit in the pipe. The edges of the wrapped film were restrained by a spring loaded cotton string during the extraction. After extraction in a trichloroethylene bath for 1.5 hours at room temperature, the sample and mandrel were removed from the bath and allowed to air dry in a fume hood. Next, the blown film was annealed in a circulating oven for 1 hour at 105 ° C. while remaining under tension on the mandrel. Specimens were cut from the extracted material and subjected to characterization. Data obtained are tabulated in Table 3. Thickness values were determined as an average of at least 10 readings distributed over the sample area. Gurley Air Flow was measured in accordance with ASTM D 726-58 (Reapproved 1971), Method A using a Gurley-Hill S-P-S Tester, Model 4190.

TABLE 3

| | Example 1 | Example 2 |
|---|---|---|
| Blow Up Ratio | 4.5 ± 0.2 | 4.4 ± 0.2 |
| Thickness, μm | 25.6 | 13.9 |
| Porosity, vol % | 74.2 | 74.7 |
| Gurley Air Flow, sec/100 cm³ | ND[1] | 199.4 ± 6.4 |

[1]ND = Not Determined.

EXAMPLES 3–5

Pelletized, microporous forming compound was prepared by compounding the formulation indicated in Table 4 in a counter-rotating 50 millimeters Leistritz twin screw extruder. The feed stocks were: (a) a mixture of ultrahigh molecular weight polyethylene, amorphous precipitated silica, antioxidant, TiO₂, lubricant, antistat, and some oil prepared by a mixing procedure similar to the Examples 1-2, (b) high density polyethylene, and (c) oil. The compounded formulation was extruded through a strand die into a water cooling bath, dried with an air knife and chopped with a rotary cutter to give microporous forming pellets approximately 2 to 3 millimeters in diameter and approximately 4 to 5 millimeters long.

TABLE 4

| | |
|---|---|
| UHMWPE[1], kg | 63.50 |
| HDPE[2], kg | 273.97 |
| Silica[3], kg | 235.87 |
| Antioxidant on Silica[4], kg | 0.96 |
| TiO$_2$[5], kg | 9.57 |
| Lubricant[6], kg | 1.27 |
| Antistat on Silica[7], kg | 0.89 |
| Oil[8], kg | 464.93 |

[1]Ultrahigh Molecular Weight Polyethylene; GUR ® 4132; Hoechst-Celanese Corp.
[2]High Density Polyethylene; Fina 1288, Fina Oil & Chemical Co.
[3]Hi-Sil ® SBG precipitated silica; PPG Industries, Inc.
[4]Rhonotec ® 201 antioxidant [Hoffmann-La Roche, Inc.] on Hi-Sil ® SBG silica @ 56% active.
[5]Ti-Pure ® R-103 Titanium Dioxide, DuPont.
[6]Petrac ® CZ-81 lubricant, Synpro Corp.
[7]Larostat ® HTS 905S surfactant; PPG Industries, Inc., 60% active on silica
[8]Tufflo ® 6056 oil, Lyondell Petroleum Corp.

The microporous forming pellets were fed to two or more extruders of an Alpine three layer coextrusion blown film line consisting of three single screw extruders equipped with hopper blenders and loss-in-weight feeders capable of feeding two or more materials to each extruder under computer control. Pellets of microporous forming material and additional high density polyethylene (Fina 1288, Fina Oil & Chemical Co.) were fed to the extruders for the outer layers to give the extrudate compositions for layers A and C whose major components are described in Table 5. The core, viz., layer B, was either pure high density polyethylene (Fina 1288, Fina Oil & Chemical Co.; Examples 3 and 4) or the same composition as the outer layers (Example 5). The relative thicknesses of the layers were adjusted by controlling the relative output of the three extruders. The extruder outputs were combined in a three layer die block and extruded through a 250 millimeter diameter ring die with either a 1.5 or 1.2 millimeter die gap. The tubular extrusion was cooled with chilled air supplied to an external air ring and also to an internal bubble cooling device. The film was drawn in the MD by increasing the take-off film speed at the nip rolls and in the TD by control of the internal bubble pressure. The throughput was approximately 295 kg/hr. The layflat width was about 132 cm. The take-off speed for multilayer films was about 26 meters/minute. The collapsed bubble was slit into two separate films and two rolls of material were wound up simultaneously.

TABLE 5

| | Example 3 | Example 4 | Example 5 |
|---|---|---|---|
| Layer A Composition, wt % | | | |
| Silica | 16.8 | 16.8 | 16.8 |
| UHMWPE | 4.5 | 4.5 | 4.5 |
| HDPE | 44.6 | 44.6 | 44.6 |
| Oil | 33.2 | 33.2 | 33.2 |
| Layer B Composition, wt % | | | |
| Silica | 0 | 0 | 16.8 |
| UHMWPE | 0 | 0 | 4.5 |
| HDPE | 100.0 | 100.0 | 44.6 |
| Oil | 0 | 0 | 33.2 |
| Layer C Composition, wt % | | | |
| Silica | 16.8 | 16.8 | 16.8 |
| UHMWPE | 4.5 | 4.5 | 4.5 |
| HDPE | 44.6 | 44.6 | 44.6 |
| Oil | 33.2 | 33.2 | 33.2 |
| Layer A Relative Feed Rate | 30 | 20 | 30 |
| Layer B Relative Feed Rate | 40 | 60 | 40 |
| Layer C Relative Feed Rate | 30 | 20 | 30 |
| Die Gap, mm | 1.5 | 1.2 | 1.5 |
| Blow up Ratio | 3.49 | 3.23 | 3.49 |

Samples of the films of Examples 3–5 were conveyed to an extractor unit where they were contacted by both liquid and vaporized 1,1,2-trichloroethylene (TCE). The films were transported over a series of rollers in a serpentine fashion to provide multiple, sequential vapor/liquid/vapor contacts. The extraction liquid in the sump was maintained at a temperature of from 65 to 88° C. Overflow from the sump of the TCE extractor was returned to a still which recovered the TCE and the processing oil for reuse in the process. The bulk of the TCE was extracted from the films by steam as the films were passed through a second extractor unit. A description of these types of extractors may be found in U.S. Pat. No. 4,648,417, including especially the structures of the devices and their modes of operation. The films were dried by radiant heat and convective air flow in a drying oven. The dried films were wound on cores.

Physical properties measured on the extracted and dried films are listed in Table 6. Tensile strength at 1% elongation was tested in accordance with ASTM D 828-60 (Reapproved 1971), except that samples 25.4 millimeters wide were tested at 25.4 millimeter per minute using an initial jaw separation of 50.8 millimeters. Handle-O-Meter Stiffness was measured in accordance with TAPPI T-498cm-85. Elmendorf Tear testing was done in accordance with ASTM D 1922-93.

TABLE 6

| | Example 3 | Example 4 | Example 5 |
|---|---|---|---|
| Thickness, μm | 43.2 | 71.1 | 76.2 |
| Basis Weight, g/m$^2$ | 34.1 | 67.6 | 70.9 |
| Strength at 1% Elongation, Mpa · m | | | |
| MD | 0.53 | 1.03 | 1.02 |
| TD | 0.72 | 1.08 | 1.41 |
| Handle-O-Meter Stiffness, g | | | |
| MD | 107 | 369 | 311 |
| Elmendorf Tear, g/ply | | | |
| MD | 39 | 87 | 98 |
| CD | 190 | 696 | 557 |

EXAMPLE 6

The ingredients given in Table 7 were combined in a 20 liter Henschel horizontal mixer by adding all dry ingredients to the mixer and blending with low speed agitation for 0.25 minutes. Hot (65° C.) oil was then sprayed onto the blended, dry ingredients over 1 minute with high speed agitation. A 0.25 minute post mix (after completion of oil addition) was used.

TABLE 7

| | |
|---|---|
| UHMWPE[1], g | 128.4 |
| HDPE[2], g | 0.0 |
| Silica[3], g | 453.6 |
| Antioxidant[4], g | 2.2 |
| Lubricant[5], g | 2.2 |
| Color Concentrate[6] | 13.3 |
| Oil[7], g | 796.9 |

[1]Ultrahigh Molecular Weight Polyethylene; GUR ® 415; Hoechst-Celanese Corp.
[2]High Density Polyethylene; Hoechst Celanese 7255 Powder, Hoechst-Celanese Corp.
[3]Hi-Sil ® SBG precipitated silica; PPG Industries, Inc.
[4]Irganox ® B-215, Ciba-Geigy Corp.
[5]Petrac ® CZ-81 lubricant, Synpro Corp.
[6]Polyblak ® 1850, A. Schulman, Inc.
[7]Shellflex ® 3681, Shell Oil Co.

Film samples were prepared by extrusion of the mix and additional oil in a Leistritz 27 millimeters counter-rotating twin screw extruder fitted with a Brabender 50.8 millimeters diameter blown film ring die with a 0.51 millimeters die gap. The feed ratio of the mix and additional oil was adjusted to give 80 weight percent oil in the extrudate. The throughput rate was approximately 5.80 kg/hr. The tubular extrudate was cooled with an air ring and drawn in the MD by motorized nip rolls located approximately 1.22 meters above the die face. Bubble formation was accomplished by inflating the tubular extrudate with 20 to 60 kPa internal air pressure. The inflated tube moved upward and was collapsed by a wooden slat collapsing frame and the aforementioned motorized nip rolls. The collapsed tube was wound up on ad driven cardboard tube at approximately 9.6 meters per minute. The layflat width was approximately 16 cm. The blow up ratio was approximately 2.

Samples of the blown film were extracted with trichloroethylene at room temperature. In order to keep the samples as flat and wrinkle free as possible, small lengths, 4.6 meters, were carefully wound onto a 57 millimeters outside diameter high density polyethylene pipe. The starting end of the film was clamped in an axial slit in the pipe. The edges of the wrapped film were restrained by a spring loaded cotton string during the extraction. After extraction in a trichloroethylene bath for 1.5 hours at room temperature, the sample and mandrel were removed from the bath and allowed to air dry in a fume hood. Next, the blown film was annealed in a circulating oven for 1 hour at 105° C. while remaining under tension on the mandrel. The average of at least 10 thickness readings distributed over the sample area was 14 micrometers.

Although the present invention has been described with reference to specific details of certain embodiments thereof, it is not intended that such details should be regarded as limitations upon the scope of the invention except insofar as they are included in the accompanying claims.

We claim:

1. Microporous material in the form of a sheet, film, tube having an internal diameter of at least 8 centimeters, or layer thereof, having a thickness in the range of from 5 to 26 micrometers which on a coating-free, printing ink-free, impregnant-free basis and pre-bonding basis comprises:
   (a) a matrix which comprises:
      (1) from 0 to 100 percent by weight high molecular weight substantially linear polyolefin which is high molecular weight substantially linear polyethylene having an ASTM D 1238-86 Condition E melt index of less than 50 grams/10 minutes, an ASTM D 1238-86 Condition F melt index of at least 0.1 gram/10 minutes, and a density in the range of from 0.910 to 0.965 gram/cubic centimeter; high molecular weight substantially linear polypropylene having an ASTM D 1238-86 Condition L melt index in the range of from 0.2 to 50 grams/10 minutes and a density greater than 0.89 gram/cubic centimeter; or a mixture thereof; and
      (2) from 0 to 100 percent by weight ultrahigh molecular weight substantially linear polyolefin which is ultrahigh molecular weight substantially linear polyethylene having an intrinsic viscosity of at least 18 deciliters/gram; ultrahigh molecular weight substantially linear polypropylene having an intrinsic viscosity of at least 6 deciliters/gram; or a mixture thereof;
      wherein the high molecular weight substantially linear polyolefin and the ultrahigh molecular weight substantially linear polyolefin collectively constitute from 90 to 100 percent by weight of the matrix;
   (b) finely divided substantially water-insoluble filler particles distributed throughout said matrix and constituting from 20 to 85 percent by weight of said microporous material, and
   (c) a network of interconnecting pores communicating substantially throughout said microporous material, the pores constituting at least 25 percent by volume of said microporous material.

2. The microporous material of claim 1 wherein:
   (a) said high molecular weight substantially linear polyolefin is said high molecular weight substantially linear polyethylene; and
   (b) said ultrahigh molecular weight substantially linear polyolefin is said ultrahigh molecular weight substantially linear polyethylene.

3. The microporous material of claim 2 wherein:
   (a) said high molecular weight substantially linear polyolefin constitutes from 0 to 99 percent by weight of said matrix; and
   (b) said ultrahigh molecular weight substantially linear polyolefin constitutes from 1 to 100 percent by weight of said matrix.

4. The microporous material of claim 2 wherein:
   (a) said high molecular weight substantially linear polyethylene constitutes from 30 to 60 percent by weight of said matrix; and
   (b) said ultrahigh molecular weight substantially linear polyolefin constitutes from 40 to 70 percent by weight of said matrix.

5. The microporous material of claim 1 wherein said high molecular weight substantially linear polyethylene constitutes 100 percent by weight of the matrix.

6. The microporous material of claim 1 wherein said ultrahigh molecular weight substantially linear polyethylene constitutes 100 percent by weight of the matrix.

7. The microporous material of claim 1 which is in the form of a film.

8. In an energy storage device having at least two electrodes separated by a dielectric material, the improvement wherein said dielectric material is microporous material of claim 7.

9. The energy storage device of claim 8 which is a battery.

10. The energy storage device of claim 9 wherein said battery is a lithium ion battery.

11. The energy storage device of claim 8 which is a capacitor.

12. The energy storage device of claim 8 which is a fuel cell.

13. A label which comprises the microporous material of claim 7.

14. The label of claim 13 wherein a surface of said microporous material constitutes an exterior surface of said label.

15. The label of claim 14 wherein said exterior surface has been written or printed upon.

16. A multi-layer film which comprises at least one layer of the microporous material of claim 7.

17. The multi-layer film of claim 16 wherein said layer of said microporous material is an exterior layer.

18. Microporous material in the form of a sheet, film, tube having an internal diameter of at least 8 centimeters, or layer thereof, having a thickness in the range of from 5 to 26 micrometers which on a coating-free, printing ink-free, impregnant-free basis and pre-bonding basis comprises:

(a) a matrix consisting essentially of substantially linear polyolefin which comprises:

(1) from 70 to 100 percent by weight high molecular weight substantially linear polyolefin which is high molecular weight substantially linear polyethylene having an ASTM D 1238-86 Condition E melt index of less than 50 grams/10 minutes, an ASTM D 1238-86 Condition F melt index of at least 0.1 gram/10 minutes, and a density in the range of from 0.910 to 0.965 gram/cubic centimeter; high molecular weight substantially linear polypropylene having an ASTM D 1238-86 Condition L melt index in the range of from 0.2 to 50 grams/10 minutes and a density greater than 0.89 gram/cubic centimeter; or a mixture thereof; and (2) from 0 to 30 percent by weight ultrahigh molecular weight substantially linear polyolefin which is ultrahigh molecular weight substantially linear polyethylene having an intrinsic viscosity of at least 18 deciliters/gram; ultrahigh molecular weight substantially linear polypropylene having an intrinsic viscosity of at least 6 deciliters/gram; or a mixture thereof;

(b) finely divided substantially water-insoluble filler particles distributed throughout said matrix and constituting from 20 to 60 percent by weight of said microporous material, and (c) a network of interconnecting pores communicating substantially throughout said microporous material, the pores constituting at least 25 percent by volume of said microporous material.

19. The microporous material of claim 18 which is in the form of a film.

20. In an energy storage device having at least two electrodes separated by a dielectric material, the improvement wherein said dielectric material is microporous material of claim 19.

21. The energy storage device of claim 20 which is a battery.

22. The energy storage device of claim 21 wherein said battery is a lithium ion battery.

23. The energy storage device of claim 20 which is a capacitor.

24. The energy storage device of claim 20 which is a fuel cell.

25. A label which comprises the microporous material of claim 19.

26. The label of claim 25 wherein a surface of said microporous material constitutes an exterior surface of said label.

27. The label of claim 26 wherein said exterior surface has been written or printed upon.

28. A multi-layer film which comprises at least one layer of the microporous material of claim 19.

29. The multi-layer film of claim 28 wherein said layer of said microporous material is an exterior layer.

* * * * *

UNITED STATES PATENT AND TRADEMARK OFFICE
CERTIFICATE OF CORRECTION

PATENT NO.   :  5,948,557                           Page 1 of 4

DATED        :  September 7, 1999

INVENTOR(S)  :  Raymond R. Ondeck et al.

It is certified that error appears in the above-identified patent and that said Letters Patent are hereby corrected as shown below:

On the title page under the heading "References Cited" and the subheading "U.S. PATENT DOCUMENTS", add references to the following patents:

3,351,495   11/1967   Larsen   ..........136/146
    4,287,276   9/1981   Lundquist   ..........429/206
    4,650,730   3/1987   Lundquist   ..........429/62

Column 1, line 42, cancel ", one embodiment of";
Column 1, line 48, change "100" to --- 99 ---;
Column 1, line 59, change "0" to --- 1 ---;
Column 2, line 2, after "water-insoluble" insert --- siliceous ---;
Column 2, lines 9-38, cancel in their entireties;
Column 3, line 24, change "100" to --- 99 ---;
Column 3, line 26, change "40 to 100" to --- 0 to 50 ---;
Column 3, line 28, change "50 to 100" to --- 0 to 40 ---;
Column 3, line 29, cancel "Commonly the high molecular weight";
Column 3, lines 30-37, cancel in their entireties;
Column 3, line 38, cancel "of the matrix.";
Column 3, line 55, cancel "at least 10 deciliters/gram. Usually the";
Column 3, line 56, cancel in its entirety;
Column 3, line 57, cancel "intrinsic viscosity is";
Column 3, line 61, cancel "10 to 39 deciliters/gram. The intrinsic";
Column 3, lines 62-63, cancel in their entireties;
Column 3, line 64, cancel "from";
Column 4, line 41, cancel "is an optional material which";
Column 4, line 41, change "0" to --- 1 ---;
Column 4, line 42, cancel "Often the ultrahigh molecu-";
Column 4, line 43-57, cancel in their entireties;

UNITED STATES PATENT AND TRADEMARK OFFICE
CERTIFICATE OF CORRECTION

PATENT NO. : 5,948,557

DATED : September 7, 1999

INVENTOR(S) : Raymond R. Ondeck et al.

It is certified that error appears in the above-identified patent and that said Letters Patent are hereby corrected as shown below:

Column 4, line 58, cancel "matrix.";
Column 5, lines 23-24, cancel in their entireties;
Column 5, lines 34-45, cancel in their entireties;
Column 7, line 18, after "water-insoluble" insert --- siliceous ---;
Column 7, line 24, after "water-insoluble" insert --- siliceous ---;
Column 11, line 49, change "EXAMPLES 1-2" to --- EXAMPLE 1 ---;
Column 11, line 60, cancel "Example 1";
Column 11, line 60, change "Example 2" to --- Example 1 ---;
Column 11, line 61, cancel "0" (first occurrence);
Column 11, line 62, cancel "716.0"
Column 11, line 63, cancel "500.0" (first occurrence);
Column 11, line 64, cancel "2.7" (first occurrence);
Column 11, line 65, cancel "2.7" (first occurrence);
Column 11, line 66, cancel "785.0" (first occurrence);
Column 12, line 3, cancel "Example 1";
Column 12, line 3, change "Example 2" to --- Example 1 ---;
Column 12, line 51, cancel "Example 1";
Column 12, line 51, change "Example 2" to --- Example 1 ---;
Column 12, line 52, cancel "4.5 ± 0.2";
Column 12, line 53, cancel "25.6";
Column 12, line 54, cancel "74.2";

Column 12, line 60, change "EXAMPLES 3-5" to --- EXAMPLES 2-4 ---;
Column 13, line 37, change "3 and 4" to --- 2 and 3 ---;
Column 13, line 38, change "(Example 5)." to --- (Example 4). ---;
Column 13, line 56, change "Example 3" to --- Example 2 ---;

UNITED STATES PATENT AND TRADEMARK OFFICE
CERTIFICATE OF CORRECTION

PATENT NO. : 5,948,557

DATED : September 7, 1999

INVENTOR(S) : Raymond R. Ondeck et al.

It is certified that error appears in the above-identified patent and that said Letters Patent are hereby corrected as shown below:

Column 13, line 56, change "Example 4" to --- Example 3 ---;
Column 13, line 56, change "Example 5" to --- Example 4 ---;
Column 14, line 3, change "Example 3" to --- Example 2 ---;
Column 14, line 3, change "Example 4" to --- Example 3 ---;
Column 14, line 3, change "Example 5" to --- Example 4 ---;
Column 14, line 16, change "3-5" to --- 2-4 ---;
Column 14, line 44, change "Example 3" to --- Example 2 ---;
Column 14, line 44, change "Example 4" to --- Example 3 ---;
Column 14, line 44, change "Example 5" to --- Example 4 ---;
Column 14, line 59, change "EXAMPLE 6" to --- EXAMPLE 5 ---;
Column 15, line 62, change "100" to --- 99 ---;
Column 16, line 8, change "0" to --- 1 ---;
Column 16, line 20, after "water-insoluble" insert --- siliceous ---;
Column 16, line 37, change "99" to --- 50 ---;
Column 16, line 40, change "1" to --- 50 ---;
Column 16, lines 49-51, cancel in their entireties;

UNITED STATES PATENT AND TRADEMARK OFFICE
CERTIFICATE OF CORRECTION

PATENT NO. : 5,948,557
DATED : September 7, 1999
INVENTOR(S) : Raymond R. Ondeck et al.

It is certified that error appears in the above-identified patent and that said Letters Patent is hereby corrected as shown below:

Column 17, lines 11-37, cancel in their entireties;
Column 18, lines 1-35, cancel in their entireties;
Column 18, after line 35, insert the following claim:
-- 30. The microporous material of claim 2 wherein said finely divided substantially water-insoluble siliceous filler particles constitute from 20 to 70 percent by weight of said microporous material. --.

Signed and Sealed this

Second Day of May, 2000

Attest:

Q. TODD DICKINSON

*Attesting Officer*  *Director of Patents and Trademarks*